United States Patent
Sakout et al.

(10) Patent No.: US 11,876,640 B2
(45) Date of Patent: Jan. 16, 2024

(54) USER STATION FOR A SERIAL BUS SYSTEM, AND METHOD FOR TRANSFERRING DATA WITH MANIPULATION PROTECTION IN A SERIAL BUS SYSTEM

(71) Applicant: Robert Bosch GmbH, Stuttgart (DE)

(72) Inventors: Anouar Sakout, Sindelfingen (DE); Horst Fuhrmann, Steinheim (DE); Thomas Lorenz, Weinstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 405 days.

(21) Appl. No.: 17/288,326

(22) PCT Filed: Oct. 23, 2019

(86) PCT No.: PCT/EP2019/078799
§ 371 (c)(1),
(2) Date: Apr. 23, 2021

(87) PCT Pub. No.: WO2020/083960
PCT Pub. Date: Apr. 30, 2020

(65) Prior Publication Data
US 2021/0377075 A1    Dec. 2, 2021

(30) Foreign Application Priority Data
Oct. 26, 2018    (DE) .......................... 102018218387.2

(51) Int. Cl.
*H04L 12/40* (2006.01)
(52) U.S. Cl.
CPC .. *H04L 12/40104* (2013.01); *H04L 12/40013* (2013.01); *H04L 12/40084* (2013.01); *H04L 2012/40215* (2013.01)

(58) Field of Classification Search
CPC ......... H04L 12/40104; H04L 12/40013; H04L 12/40084; H04L 2012/40215; H04L 12/40; H04L 9/34
See application file for complete search history.

(56) References Cited

U.S. PATENT DOCUMENTS

| 11,706,049 B2 * | 7/2023 | Mutter .............. H04L 12/40052 710/305 |
| 2016/0286066 A1 * | 9/2016 | Mitobe ................ H04N 1/0083 |

(Continued)

FOREIGN PATENT DOCUMENTS

| DE | 102014007820 A1 | 12/2015 |
| EP | 3386163 A1 | 10/2018 |

OTHER PUBLICATIONS

ISO 11898-2: "Road vehicle—Controller area Network (CAN)—Part 2: High-speed medium access unit." Dec. 2016, 40 Pages.

(Continued)

*Primary Examiner* — Abiy Getachew
(74) *Attorney, Agent, or Firm* — NORTON ROSE FULBRIGHT US LLP; Gerard A. Messina

(57) ABSTRACT

A user station for a serial bus system and a method for transferring data with manipulation protection in a serial bus system. The user station includes a communication control device for creating messages which are to be transmitted serially via a bus line to at least one other user station of the bus system, and/or for reading the messages which have been received serially from the bus line. The communication control device is designed to use a predetermined communication rule for creating and/or reading messages, and the communication control device, for creating and/or reading messages, is designed to use at least one rule for creating and/or reading the messages, which is different from the predetermined communication rule, when a predetermined trigger occurs.

10 Claims, 3 Drawing Sheets

(56) References Cited

U.S. PATENT DOCUMENTS

2016/0344764 A1* 11/2016 Otsuka ................... H04L 63/08
2017/0262400 A1*  9/2017 Hartwich .............. H04L 1/0041
2018/0205572 A1*  7/2018 Kishigami .......... H04L 25/0272

OTHER PUBLICATIONS

International Search Report for PCT/EP2019/078799, dated Dec. 18, 2019.

* cited by examiner

USER STATION FOR A SERIAL BUS SYSTEM, AND METHOD FOR TRANSFERRING DATA WITH MANIPULATION PROTECTION IN A SERIAL BUS SYSTEM

FIELD

The present invention relates to a user station for a serial bus system, and a method for transferring data with manipulation protection in a serial bus system.

BACKGROUND INFORMATION

In order to transfer data between user stations of a serial bus system, the user stations of the bus system encode the data in temporally successive bits. The bits are subsequently transmitted in succession onto the bus as messages according to a predetermined communication protocol and transferred via the bus. The communication protocol establishes at which point of the message which data or bits are encoded. For hard-wired bus systems, at least one line is used as a transfer medium for transferring the data between the user stations.

For example, serial communication protocols with bit arbitration are available, such as conventional CAN and CAN FD, which according to ISO 11898-2 use a recessive and a dominant bus level as two different bit levels. During the arbitration, based on an identifier of the message it is negotiated, between the transmitters in the bus system, which transmitter in the next communication phase must abandon the transmission, and for the remainder of the running message act only as a receiver, and which transmitter in the next communication phase may subsequently transmit its data without causing destruction. In a present-day vehicle, such as a motor vehicle, a truck, etc., bus systems are used which utilize the above-mentioned communication protocols.

It is problematic that each CAN-capable electronics unit in a conventional CAN matrix is able to simulate the CAN messages with the correct identifier and the correct check sum, which is created according to a cyclic redundancy check (CRC). The receiver of the CAN message is not able to distinguish whether the information has been transmitted by a control unit that is provided for it, in particular an electronic control unit (ECU), or by a retrofitted CAN-capable (external) electronics unit. In addition, a transmitter is not able to recognize that another unit, such as the retrofitted CAN-capable (external) electronics unit, is transmitting the same message in the data field, but with a different content. As a result, the behavior of one or multiple control units or user stations of the bus system of the vehicle may be manipulated by an unauthorized intervention into the CAN communication.

SUMMARY

An object of the present invention is to provide a user station for a serial bus system and a method for transferring data with manipulation protection in a serial bus system which solve the above-mentioned problems. In particular, in accordance with example embodiment of the present invention, a user station is provided for a serial bus system, and a method is provided for transferring data with manipulation protection in a serial bus system in which a manipulation of the behavior of a functional part of one or multiple user stations, which in particular is the function of a control unit of a vehicle, is at least made more difficult or is not possible.

The object may achieved by a user station of a serial bus system in accordance with an example embodiment of the present invention. In accordance with an example embodiment of the present invention, the user station includes a communication control device for creating messages which are to be transmitted serially via a bus line to at least one other user station of the bus system, and/or for reading the messages which have been received serially from the bus line, the communication control device being designed to use a predetermined communication rule for creating and/or reading messages, and the communication control device, for creating and/or reading messages, being designed to use at least one rule for creating and/or reading the messages, which is different from the predetermined communication rule, when a predetermined trigger occurs.

The user station allows the association, thus far fixed and static, of a data field in the frame to be serially transferred and/or of a frame identifier, in particular the CAN ID, to be dynamically changeable. Thus, simple "eavesdropping" and manipulation of such a frame is no longer easily possible.

Moreover, the user station ensures that the data volume does not increase despite the manipulation protection that is used. This is a major advantage over other encryption techniques, since for the standard CAN protocol, for example, only a maximum of 8 bytes of useful data per frame may be transferred. In addition, the complexity present in the conventional encryption methods may be avoided.

As a result, the user station effectuates that a manipulation of the behavior of one or multiple user stations of the bus system, which is/are in particular control units of a vehicle, is at least made more difficult or effectively prevented without impairing the data transfer properties. This is advantageous in particular for exhaust gas-relevant control units of a vehicle, which are to be protected from manipulation in such a way that, for example, effects on the software of the control unit are preventable.

The method carried out by the user station may be subsequently incorporated into a serial communication protocol, in particular into the CAN protocol specification with CAN FD according to the above-mentioned standard. For example, the incorporation as an option that may be selectively installed or activated for each application parameter is possible.

Advantageous further embodiments of the user station are disclosed herein.

It is possible for the communication control device to be designed to create and/or to read at least one first message and one second message, in which according to the predetermined communication rule in each case fields are situated in succession which differ in their function with regard to the communication in the bus system, the communication control device being designed to exchange, according to the different rule, at least a portion of a field of the first message with a portion of a field of the second message.

According to one exemplary embodiment of the present invention, the at least one portion of the field of the first message is a data field in which data for a functional part of the user station are serially situated, and the at least one portion of the field of the second message is a data field in which data for a functional part of the user station are serially situated, and the communication control device being designed to exchange the data fields of the first and second messages with one another.

The first message may include at least two signals in its data field and the second message may include at least two signals in its data field, in each case data for a functional part of the user station being serially situated in the data fields, and the communication control device being designed to exchange at least one signal of the first and second messages with one another.

In one particular embodiment of the present invention, the first message may include at least two signals in its data field and the second message may include at least two signals in its data field, in each case data for a functional part of the user station being serially situated in the data fields, and the communication control device being designed to change the order of the at least two signals in the data field of the first and/or second message.

According to another exemplary embodiment of the present invention, the at least one portion of the field of the first message is an identifier in an arbitration field, and the at least one portion of the field of the second message is an identifier in an arbitration field, the communication control device being designed to exchange the identifiers of the first and second messages with one another.

The predetermined trigger is optionally a predetermined point in time and/or a predetermined event during operation of the user station.

The user station is possibly designed for a bus system in which an exclusive, collision-free access of a user station to a bus line of the bus system is ensured, at least temporarily.

The message created and/or received by the user station may be a CAN message or a CAN FD message.

The user station described above may be part of a bus system that also includes a bus line and at least two user stations that are connected to one another via the bus line in such a way that they may communicate with one another. At least one of the at least two user stations is a user station described above.

Moreover, the object stated above may achieved by a method for transferring data with manipulation protection in a serial bus system according to an example embodiment of the present invention. In accordance with an example embodiment of the present invention, the method includes the step: creating messages, using a communication control device of a first user station of the bus system, which are to be transmitted serially via a bus line to at least one second user station of the bus system, and/or reading the messages that have been received serially from the bus line, the communication control device being designed to use a predetermined communication matrix for creating and/or reading messages, and the communication control device, for creating and/or reading the messages, being designed to use at least one rule for creating and/or reading the messages, which is different from the predetermined communication matrix, when a predetermined trigger occurs.

The method described above may yield the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
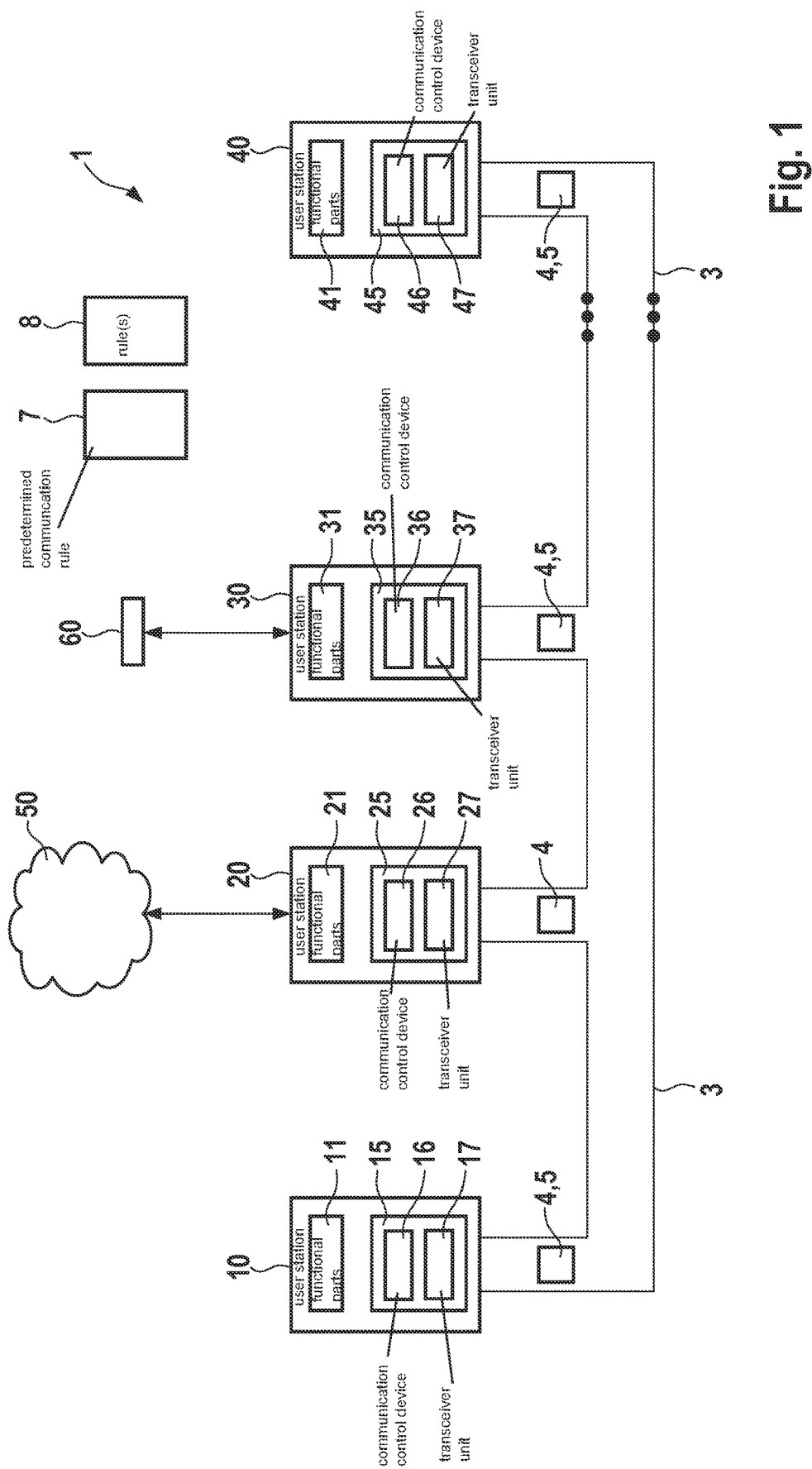
FIG. 1 shows a simplified block diagram of a bus system according to a first exemplary embodiment of the present invention.

FIG. 1 shows as an example a bus system 1 which in particular may be designed as an arbitrary serial bus system. In particular, bus system 1 is a CAN bus system, a CAN FD bus system, a FlexRay bus system, a bus system for Ethernet, a Gigabit Ethernet, etc. Bus system 1 may be used in a vehicle, in particular a motor vehicle, an aircraft, etc., or in a hospital, and so forth.

In FIG. 1, bus system 1 includes a bus line 3, in particular designed as a two-wire line, to which a plurality of user stations 10, 20, 30, 40 is connected. Further units 50, 60 such as a central data memory location, in particular a cloud, or a sensor are connectable to user stations 10, 20, 30, 40. Units 50, 60 are not directly connected to bus system 1.

Messages 4, 5 in the form of signals are serially transferrable between individual user stations 10, 20, 30, 40 via bus line 3. User stations 10, 20, 30, 40 are arbitrary devices that are intended to serially exchange data with one another, for example control units, sensors, display devices, etc., of a motor vehicle. In the stated example, user station 10 is a driving control unit (DCU) for an SCR exhaust aftertreatment system or an electronic control unit (ECU) of the vehicle, user station 20 is a LIDAR sensor, user station 30 is a vehicle control unit (VCU), and user station 40 is a navigation system. In the present case, unit 50 is a cloud and unit 60 is a yaw sensor. However, user stations 10, 20, 30, 40 may be any other arbitrary devices. In addition, further devices may be connected to bus system 1, for example a lane marking detection sensor, a nitrogen oxides (NOx) sensor, or some other arbitrary combination of devices, which, however, are not illustrated here for simplicity. The same applies for units 50, 60.

Alternatively, user stations 10, 20, 30, 40 are, for example, computers of a computer network and/or components of an automation network, in particular for an industrial facility.

However, user stations 10, 20, 30, 40 are not limited to the specific examples stated. At least two of user stations 10, 20, 30, 40 are present in bus system 1.

The present invention is described below as an example with reference to the CAN and CAN FD bus systems. However, the present invention is not limited thereto, and the present invention may be applied on an arbitrary serial bus system 1.

As shown in FIG. 1, user station 10 includes a functional part 11, and an interface 15 that includes a communication control device 16 and a transceiver unit 17. User station 20 includes a functional part 21, and an interface 25 that includes a communication control device 26 and a transceiver unit 27. User station 30 includes a functional part 31, and an interface 35 that includes a communication control device 36 and a transceiver unit 37. User station 40 includes a functional part 41, and an interface 45 that includes a communication control device 46 and a transceiver 47 unit. Transceiver units 17, 27, 37, 47 of user stations 10, 20, 30, 40 are in each case directly connected to bus line 3, although this is not illustrated in FIG. 1.

Functional parts 11, 21, 31, 41 carry out the particular function of user station 10, 20, 30, 40, for example the function of a navigation device for user station 40 in the example mentioned above, the function of a drive, etc. Communication control devices 16, 26, 36, 46 are each used for controlling a communication of particular user station 10, 20, 30, 40, more precisely, its functional part 11, 21, 31, 41, via bus line 3, using a different user station of user stations 10, 20, 30, 40 that are connected to bus line 3. Communication control devices 16, 26, 36, 46 use a predetermined communication rule 7, and on a case-by-case basis, additionally at least one rule 8 that is different from the predetermined communication rule, for creating and/or reading a message 4, 5.

Predetermined communication rule 7 is, for example, a predetermined communication matrix, in particular a CAN matrix, in which it is established, among other things, which user station 10, 20, 30, 40 transmits which message 4, 5, under what conditions and with what cycle time, with what priority messages 4, 5 are to be transmitted, which signals are contained in messages 4, 5 and in what form, and which user station 10, 20, 30, 40 receives which message 4, 5. The at least one rule 8 that is different from predetermined communication rule 7 is described in greater detail below.

For the example mentioned above, communication control device 26 may be designed as a conventional CAN controller except for the differences described in greater detail below. In this case, communication control device 26 creates and/or reads first messages 4, for example modified conventional CAN messages 4. Except for the modifications described in greater detail below, conventional CAN messages 4 are built up according to the conventional base format, in which a number of up to 8 data bytes may be included in message 4. Transceiver unit 27 may thus be designed as a conventional CAN transceiver except for the differences described in greater detail below.

For the example mentioned above, communication control devices 16, 36, 46 may be designed in such a way that they may create and/or read first messages 4, for example modified conventional CAN messages 4, as well as second messages 5, which are modified CAN FD messages 5, for example. Except for the modifications described in greater detail below, modified CAN FD messages 5 are built up based on a CAN FD format, in which a number of up to 64 data bytes, for example, may be included in message 5, as shown in the bottom portion of FIG. 2. In the stated example of the CAN bus system, communication control devices 16, 36, 46 may thus each provide a modified conventional CAN message 4 or a modified CAN FD message 5 for associated transceiver unit 17, 37, 47 and/or receive from same, as needed. Communication control devices 16, 36, 46 thus create and/or read a first message 4 or second message 5, first and second messages 4, 5 differing by their data transmission standard, namely, modified CAN or modified CAN FD in this case.

Transceiver units 17, 37, 47 may be designed to provide messages 4 according to the modified CAN base format or messages 5 according to the modified CAN FD format for associated communication control device 16, 26, 46, 76 or to receive from same, as needed.

Alternatively, formation and then transfer of messages 5 with the modified CAN FD or also with higher data rates than CAN FD are achievable using user stations 10, 20, 40.

Figure 2:
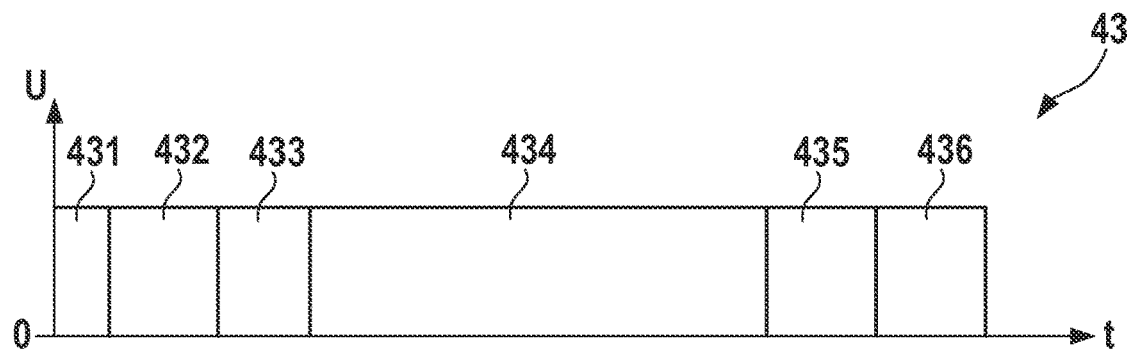
FIG. 2 shows a diagram for illustrating the design of messages that may be transmitted from user stations of the bus system according to the first exemplary embodiment of the present invention.

FIG. 2 shows for message 4 a CAN frame 43, which is transmitted from one of transceiver units 10, 20, 30, 40 with a voltage U as a function of time t. Voltage U is shown in a greatly simplified manner in FIG. 2. In reality, the value of voltage U changes depending on the information of the bit in frame 43 to be transferred between the various bus voltage levels, which correspond to logical bit levels 0 and 1. CAN frame 43 is divided into different fields for the CAN communication on bus 3, namely, a start field 431, an arbitration field 432, a control field 433, a data field 434, a check sum field 435, and an end field 436. A message 5 is built up in the same way. However, for message 5, in particular data field 434 is temporally shorter than for message 4 or CAN frame 43, since for a CAN FD frame of message 5 the bits of data field 434 are transmitted at a higher bit rate than for message 4. In addition, for message 5, more bytes are transmittable in data field 434 than for message 4 or CAN frame 43, as also described in greater detail below.

Start field 431 includes one bit, for example, also referred to as SOF bit, and indicates the start of frame.

Arbitration field 432 contains an identifier including 32 bits, for example, for identifying the transmitter of the message. Arbitration field 432 may additionally contain a piece of protocol format information made up of one or multiple bits, which is suitable for distinguishing CAN frames or CAN FD frames.

Control field 433 contains a data length code that is 13 bits long, for example, which may then assume values from 1 to 64 with an increment of 1. The data length code may also include fewer or more bits, and the value range and the increment may assume other values. Control field 433 may additionally contain a piece of protocol format information made up of one or multiple bits, which is suitable for distinguishing CAN frames or CAN FD frames.

Data field 434 contains the useful data of the CAN frame or of message 43. The useful data may include 8 or up to 64 bytes, for example, corresponding to the value range of the data length code.

Check sum field 435 contains a check sum concerning the data in data field 434, including stuff bits, possibly present, which are inserted by the transmitter of message 4 as inverse bits after a predetermined number of identical bits, for example 5, 6, 7, 8, 9, 10, etc., according to the above-mentioned CAN protocol. End field 436 contains at least one acknowledge bit, and also a sequence of 11 identical bits that indicate the end of CAN frame 43. The at least one acknowledge bit may be used to communicate whether or not a receiver has discovered an error in received CAN frame 43 or message 4.

A physical layer according to CAN and CAN FD is used in the phases for transmitting arbitration field 432 and end field 436. During the arbitration, with the aid of the identifier in arbitration field 432, bit-by-bit negotiation is carried out between user stations 10, 20, 30, 40 concerning which user station 10, 20, 30, 40 would like to transmit message 4, 5 having the highest priority, and therefore for the next time period for transmitting fields 433 through 435, obtains exclusive access to bus 3 of bus system 1. An important point during these phases is that the conventional CSMA/CR method is used, which allows simultaneous access of user stations 10, 20, 30, 40 to bus 3 without destroying higher-priority message 4, 5.

In the CSMA/CR method, the bus voltage levels are selected, taking into account the transfer medium of bus 3, in such a way that the dominant level may overwrite the recessive level. Thus, for example, a transmitter that transmits a recessive bit ('1') during the arbitration and instead "sees" a dominant bit ('0') on bus 3 may abandon the transmission, and for the remainder of running message 4, 5 act only as a receiver. The arbitration is won by the transmitter whose message 4, 5 contains the most leading '0' bits. The winner of the arbitration does not notice any access conflict for bus 3. Thus, there is no collision and therefore no destruction of transmitted messages 4, 5. For this reason, the arbitration and the subsequent communication in which data field 434 and thus, the actual data to be transferred are transmitted, take place without causing destruction. Further user stations 10, 20, 30, 40 may thus be added to bus system 1 relatively easily, which is very advantageous.

For a serial bus system 1 without arbitration 432, such as Ethernet, FlexRay, etc., arbitration field 432 is dispensed with.

Control field 433 and data field 434 are not transmitted by a user station 10, 20, 30, 40, as transmitter of message 4, onto bus 3 until the user station has won the arbitration, and the user station thus has exclusive access to bus 3 of bus system 1 for transmitting fields 433 through 436.

Communication control devices 16, 26, 36, 46 are designed to create and/or read frames 43 for messages 4, 5. In addition, communication control devices 16, 26, 36, 46 are designed to create and/or read frames 4301, 4302 according to FIG. 3 for messages 4, 5 when a predetermined trigger 70 occurs. Frame 4301 includes an identifier 0x01. Frame 4302 includes an identifier 0x02.

Figure 3:
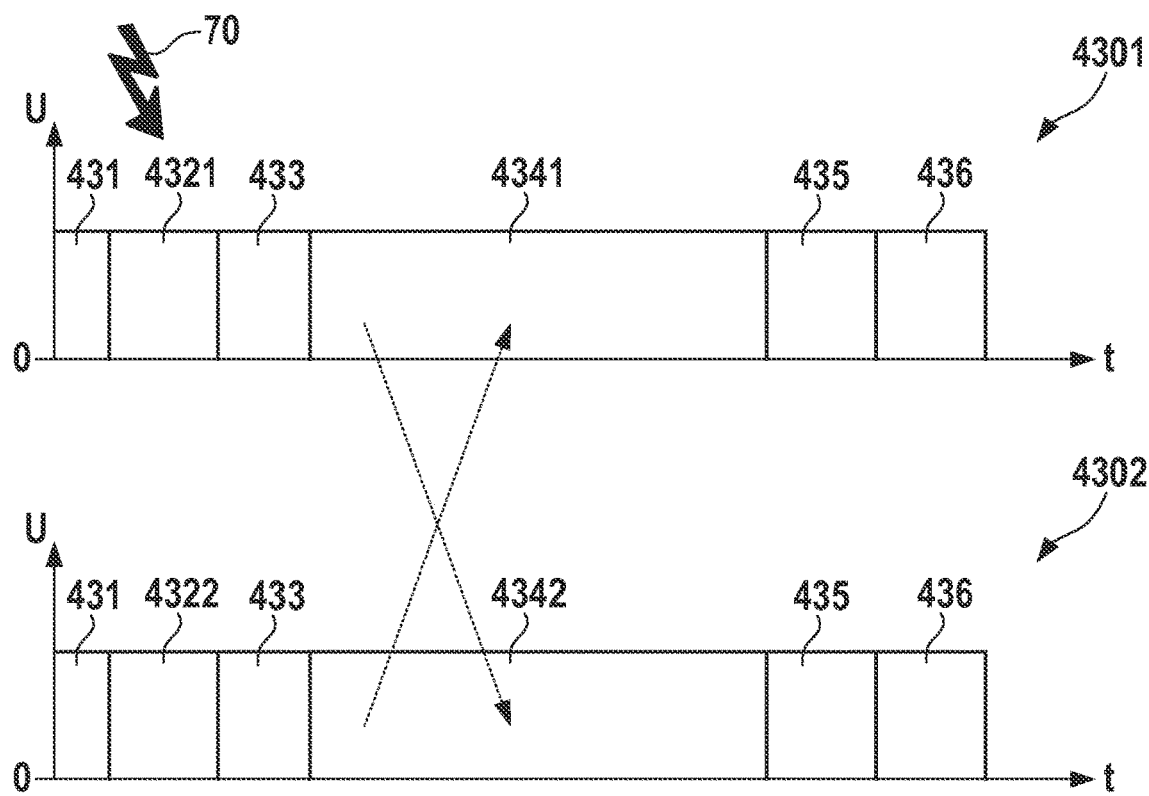
FIG. 3 shows a diagram for illustrating the design of messages that may be transmitted from user stations of the bus system according to the first exemplary embodiment of the present invention.

For creating frames 4301, 4302 according to FIG. 3, communication control devices 16, 26, 36, 46 are designed to exchange data contents in data fields 4341, 4342 of frames 4301, 4302 when predetermined trigger 70, which differs from actual communication rule 7, occurs. Rule 8 is used, which differs from communication rule 7. This is illustrated in FIG. 3 by the arrows at data fields 4341, 4342.

Predetermined trigger 70 is a piece of information and/or an element which are/is interpreted the same way by communication control device 16, 26, 36, 46 of the transmitting user station and by communication control device 16, 26, 36, 46 of the receiving user station, and which prompt(s) the new computation of the association of the useful pieces of information with messages 4, 5, which differs from the association of the actual communication matrix.

Predetermined trigger 70 is a predetermined point in time t1. Additionally or alternatively, predetermined trigger 70 is a predetermined event during operation of at least one of user stations 10, 20, 30, 40. Predetermined trigger 70 may in particular include at least one of the following trigger conditions, namely:

engine or drive rotational speed above a threshold for a certain time period first exceedance of a torque threshold of a drive transition of a state of a control device from standby mode into another operating state such as "running"

reaching a certain cooling water temperature simultaneous occurrence of agreed values of two CAN signals a data pattern that is determined in a nonvolatile memory reaching the coasting mode of a drive at least one diagnostic function with which a diagnosis of an operation of a technical facility is carried out, in particular in or at a vehicle.

Of course, additional or other trigger conditions are possible as predetermined trigger 70.

Thus, communication control devices 16, 26, 36, 46 insert data field 4341 into frame 4301, and data field 4342 into frame 4302, if no trigger 70 occurs. However, if predetermined trigger 70 occurs, communication control devices 16, 26, 36, 46 insert data field 4341 into frame 4302, and data field 4342 into frame 4301, as illustrated in FIG. 3. In the latter case, frame 4301 then transfers the data from data field 4342 of frame 4302 instead of the data from data field 4341. Thus, frame 4302 then transfers the data from data field 4341 instead of the data from data field 4342. Upon receipt of frame(s) 43 or 4301, 4302, the data from data fields 434, 4341, 4342 are in each case once again associated with a predetermined algorithm and thus appropriately processed to ensure the correct interpretation of the data from data fields 434, 4341, 4342.

Thus, at least two of user stations 10, 20, 30, 40, more precisely, their communication control devices 16, 26, 36, 46, carry out a method in which the option is provided, via an exchange of data field 434 of frame 43 or of data fields 4341, 4342, to impede the manipulation of a data transfer in bus system 1.

The method may be applied in various states of functional part 11, 21, 31, 41 of user stations 10, 20, 30, 40. The method may preferably be used after a "terminal 15 on" state. In most applications, "terminal 15 on" means that the CAN communication of all user stations 10, 20, 30, 40 starts. The communication begins unencrypted, i.e., without the method for manipulation protection described above. However, starting at this point in time, predetermined trigger 70 is awaited, after which the encryption or the above-described method for manipulation protection is activated.

Figure 4:
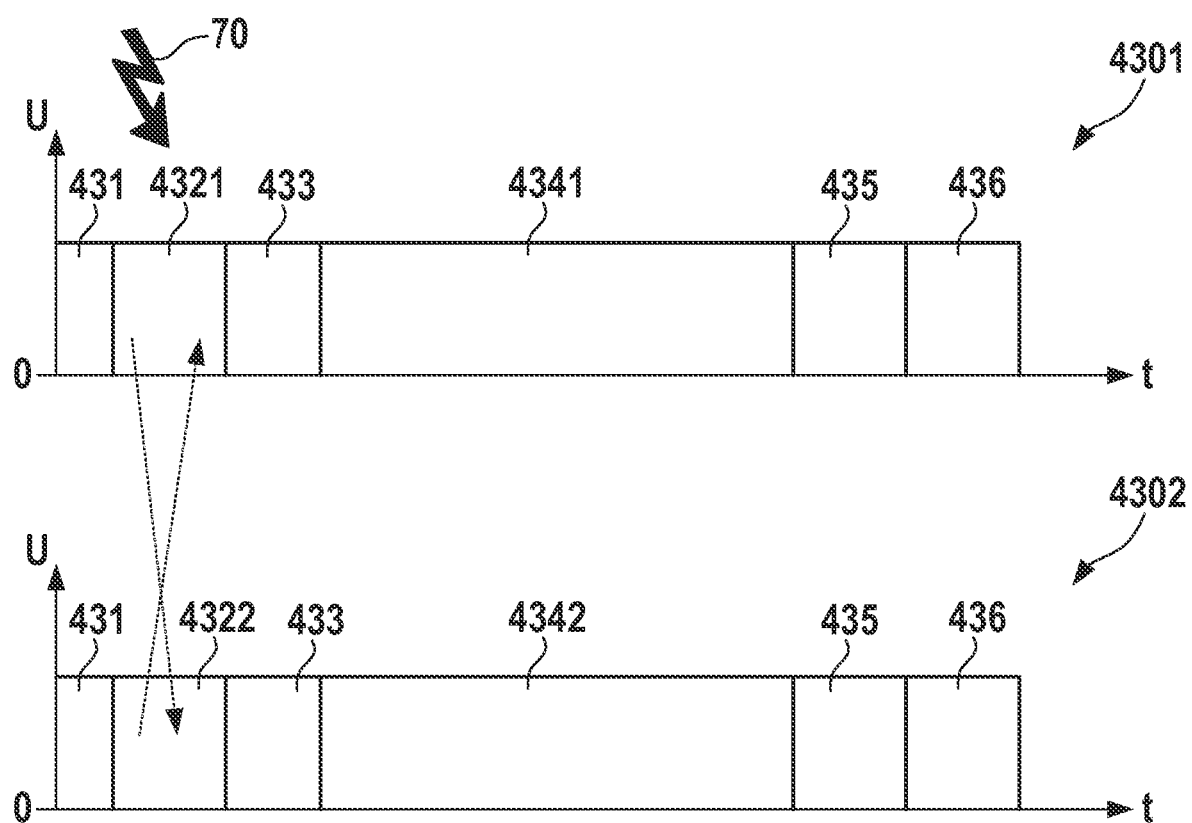
FIG. 4 shows a diagram for illustrating the design of messages that may be transmitted from user stations of the bus system according to a second exemplary embodiment of the present invention.

FIG. 4 illustrates the embodiment of communication control devices 16, 26, 36, 46 according to a second exemplary embodiment. In the present case, communication control devices 16, 26, 36, 46 are designed to exchange the identifiers in arbitration field 432 of frame 4301, 4302 when predetermined trigger 70 occurs.

Thus, communication control devices 16, 26, 36, 46 insert identifier 0x01 into frame 4301, and identifier 0x02 into frame 4302, if no trigger 70 occurs. However, if predetermined trigger 70 occurs, communication control devices 16, 26, 36, 46 insert identifier 0x01 into frame 4302, and identifier 0x02 into frame 4301, as illustrated in FIG. 4.

Thus, there is an option to impede the manipulation via the identifier of frame(s) 43 or 4301, 4302.

Otherwise, the same description in conjunction with FIGS. 1 through 3 applies.

According to one modification, communication control device 16, 26, 36, 46 notices that the priority of message 4, 5 changes when identifiers 0x01, 0x02 are exchanged. Consequently, communication control device 16, 26, 36, 46 may, for example, notice that identifier 0x01, 0x02 is changed by successive messages 4, 5 only when these are messages 4, 5 that have medium to low priority. Thus, identifiers 0x01, 0x02 are not changed by successive messages 4, 5 if at least one of messages 4, 5 has a high priority.

Alternatively or additionally, it is possible to take into account that for some vehicle classes, for example the CAN communication is defined by standards. The frames are thus normalized with regard to identifiers and the content and position of the data fields. When the above-described encryption method is applied, the affected frames would become proprietary frames. To ensure compatibility with standards, the affected identifiers are to be denoted by the "proprietary" feature. The above-described encryption method for messages 4, 5 may thus be applied to normalized as well as proprietary frames.

According to one modification, a combination of the first and second exemplary embodiments and/or their modifications is possible.

According to a third exemplary embodiment, communication control devices 16, 26, 36, 46 are also designed to arrange multiple signals in succession as data in a data field 4340 in messages M1 through Mn, which are either messages 4 or messages 5, according to communication rule 7. If messages M1 through Mn contain identifiers ID-M1 through ID-Mn, an arrangement of signals 1 through 10 could result, for example at a predetermined point in time t1 and/or after a predetermined event 1, as shown in Table 1 below. Control field 433 is unchanged, the same as with other messages 4, 5 in bus system 1. The CRC check sum in CRC field 435 is computed in the customary way. Therefore, neither the content of control field 433 nor the content of CRC field 435 is illustrated in greater detail.

TABLE 1

| Message | ID | Control field 433 | Data field 4340 | | | | | CRC field |
|---|---|---|---|---|---|---|---|---|
| M1 | ID-M1 | XXX | signal 1 | signal 2 | signal 3 | signal 4 | signal 5 | >>>> |
| M2 | ID-M2 | XXX | signal 6 | signal 7 | Signal 8 | | | >>>> |
| M . . . | ID-M... | XXX | ... | ... | ... | ... | ... | >>>> |
| Mn | ID-Mn | XXX | signal 9 | signal 10 | Signal 11 | | | >>>> |

Thus, signals 1 through 5 are arranged in succession in data field 4340 of message M1, which contains identifier ID-M1. In contrast, signals 6 through 8 are arranged in succession in data field 4340 of message M2, which contains identifier ID-M2. In contrast signals 9 through 11 are arranged in succession in data field 4340 of message Mn, which contains identifier ID-Mn.

If a predetermined point in time t2 and/or a predetermined event 2 occur(s) as trigger 70, at least two of communication control devices 10, 20, 30, 40 are designed to exchange messages 4, 5 via bus 3 according to rule 8, in which transmitting communication control device 10, 20, 30, 40 has dynamically changed data fields 4340 of messages M1 and M2 in data field 4340, for example as shown in Table 2 below.

TABLE 2

| Message | ID | Control field 433 | Data field 4340 | | | | | CRC field |
|---|---|---|---|---|---|---|---|---|
| M1 | ID-M1 | XXX | Signal 6 | signal 7 | Signal 8 | | | >>>> |
| M2 | ID-M2 | XXX | signal 1 | signal 2 | signal 3 | signal 4 | signal 5 | >>>> |
| M . . . | ID-M . . . | XXX | ... | ... | ... | ... | ... | >>>> |
| Mn | ID-Mn | XXX | signal 9 | signal 10 | Signal 11 | | | >>>> |

Thus, according to rule 8, in the example shown in Table 2 the contents of data field 4340 for messages M1 and M2 have been interchanged with one another. In contrast, the content of data field 4340 for message M . . . through Mn is unchanged.

If a predetermined point in time tx and/or a predetermined event x occurs as trigger 70, at least two of communication control devices 10, 20, 30, 40 are designed to exchange messages 4, 5 via bus 3 according to rule 8, in which transmitting communication control device 10, 20, 30, 40 has dynamically changed data fields 4340 of messages M1 and M2 in data field 4340, for example as shown in Table 3 below.

| Message | ID | Control field 433 | Data field 4340 | | | | | CRC field |
|---|---|---|---|---|---|---|---|---|
| M1 | ID-M1 | XXX | signal 6 | signal 7 | signal 8 | | | >>>> |
| M2 | ID-M2 | XXX | signal 9 | signal 10 | signal 11 | | | >>>> |
| M . . . | ID-M . . . | XXX | | | | | | >>>> |
| Mn | ID-Mn | XXX | signal 1 | signal 2 | signal 3 | signal 4 | signal 5 | >>>> |

Thus, according to rule 8, in the example shown in Table 3 the contents of data field 4340 for messages M1 and M2 have been interchanged with one another. In contrast, the content of data field 4340 for message M1 is unchanged.

At least two of communication control devices 10, 20, 30, 40 may thus dynamically manage the association of signals 1 through 10 with messages 4, 5. After predetermined trigger 70 occurs, the association of signals with messages 4, 5 is changed, using an algorithm with the aid of a coordinator.

Otherwise, the same description in conjunction with FIGS. 1 through 3 applies.

According to a fourth exemplary embodiment, the order of signals 1 through 10 for messages 4, 5 is dynamically managed by at least two of communication control devices 10, 20, 30, 40 according to rule 8. Thus, message M1 from Table 1 may first transfer signal 3, then signal 4, then signal 5, then signal 1, and then signal 2 in data field 434. Other arbitrary orders of the signals in data field 434 are possible.

Otherwise, the same description in conjunction with the third exemplary embodiment applies.

All of the above-described embodiments of bus system 1, of user stations 10, 20, 30, 40, and of the method carried out by user stations 10, 20, 30, 40 may be used alone or in any possible combination. In particular, all features of the above-described exemplary embodiments and/or embodiment variants thereof and/or modifications thereof may be arbitrarily combined. Additionally or alternatively, in particular the following modifications are possible.

Above-described bus system 1 according to the exemplary embodiments is described with reference to a bus system based on the CAN protocol. However, bus system 1 according to the exemplary embodiments may alternatively be some other type of serial communications network. It is advantageous, but not a mandatory requirement, that in bus system 1, exclusive, collision-free access of a user station 10, 20, 30 to a shared channel is ensured, at least for certain time periods.

In the above-described exemplary embodiments and modifications thereof, the number and arrangement of user stations 10, 20, 30, 40 in bus system 1 of the exemplary embodiments is arbitrary.

For the purpose of component exchange, it is advantageous to store the appropriate pieces of information concerning the instantaneously valid dynamic adaptation, which is carried out by the at least two user stations 10, 20, 30, 40 in data fields 434, 4341, 4342 as described above, in an electrically erasable programmable read-only memory (EEPROM) (nonvolatile random-access memory (NVRAM)). In addition, it is advantageous to appropriately secure the stored pieces of information concerning the instantaneously valid dynamic adaptation.

Alternatively, an EEPROM may be dispensed with. In this case, predetermined trigger 70 may be computed in an, in particular, manipulation-protected algorithm that uses a combination of the trigger conditions stated as examples, explained for the first exemplary embodiment.

What is claimed is:

1. A user station for a serial bus system, comprising:
a communication control device configured to create messages which are to be transmitted serially via a bus line to at least one other user station of the bus system, and/or to read the messages which have been received serially from the bus line, the communication control device being configured to use a predetermined communication rule to create and/or read the messages, and the communication control device, for creating and/or reading the messages, being configured to use, when a predetermined trigger occurs, at least one rule for creating and/or reading the messages, which is different from the predetermined communication rule;
wherein the communication control device is configured to create and/or to read at least one first message and one second message, in each of which, according to the predetermined communication rule, fields are situated in succession which differ in their function with regard to a communication in the bus system, the communication control device being configured to exchange, according to the different rule, at least a portion of a field of the first message with a portion of a field of the second message.

2. The user station as recited in claim 1, wherein the at least one portion of the field of the first message is a first data field in which data for a functional part of the user station are serially situated, and the at least one portion of the field of the second message is a second data field in which data for the functional part of the user station are serially situated, and the communication control device is configured to exchange the first and second data fields of the first and second messages with one another.

3. The user station as recited in claim 1, wherein the first message includes at least two signals in a first data field and the second message includes at least two signals in a second data field, in each case data for a functional part of the user station being serially situated in the first and second data fields, and wherein the communication control device is configured to exchange at least one signal of the first and second messages with one another.

4. The user station as recited in claim 1, wherein the first message includes at least two signals in a first data field and the second message includes at least two signals in a second data field, in each case data for a functional part of the user station being serially situated in the first and second data fields, and wherein the communication control device is configured to change an order of the at least two signals in the first data field of the first and/or in the second data field of the second message.

5. The user station as recited in claim 1, wherein the at least one portion of the field of the first message is an identifier in an arbitration field, and the at least one portion of the field of the second message is an identifier in an arbitration field, and wherein the communication control device is configured to exchange the identifiers of the first and second messages with one another.

6. The user station as recited in claim 1, wherein the predetermined trigger is a predetermined point in time and/or a predetermined event during operation of the user station.

7. The user station as recited in claim 1, wherein the user station is configured for a bus system in which an exclusive, collision-free access of a user station to the bus line of the bus system is ensured, at least temporarily.

8. The user station as recited in claim 1, wherein each of the first message and the second message is a CAN message or a CAN FD message.

9. A bus system, comprising:
a bus line; and
at least two user stations that are connected to one another via the bus line in such a way that they may communicate with one another, at least one of the at least two user stations including:
a communication control device configured to create messages which are to be transmitted serially via a bus line to at least one other user station of the bus system, and/or to read the messages which have been received serially from the bus line, the communication control device being configured to use a predetermined communication rule to create and/or read the messages, and the communication control device, for creating and/or reading the messages, being configured to use, when a predetermined trigger occurs, at least one rule for creating and/or reading the messages, which is different from the predetermined communication rule;
wherein the communication control device is configured to create and/or to read at least one first message and one second message, in each of which, according to the predetermined communication rule, fields are situated in succession which differ in their function with regard to a communication in the bus system, the communication control device being configured to exchange, according to the different rule, at least a portion of a field of the first message with a portion of a field of the second message.

10. A method for transferring data with manipulation protection in a serial bus system, the method comprising:
creating messages, using a communication control device of a first user station of the bus system, which are to be transmitted serially via a bus line to at least one second user station of the bus system, and/or reading the messages, using the communication control device, that have been received serially from the bus line, the communication control device being configured to use a predetermined communication matrix for creating and/or reading the messages, and the communication control device, for creating and/or reading the messages, being configured to use, when a predetermined trigger occurs, at least one rule for creating and/or reading the messages, which is different from the predetermined communication matrix;
wherein the communication control device is configured to create and/or to read at least one first message and one second message, in each of which, according to the predetermined communication rule, fields are situated in succession which differ in their function with regard to a communication in the bus system, the communication control device being configured to exchange, according to the different rule, at least a portion of a field of the first message with a portion of a field of the second message.

* * * * *